(12) United States Patent
Mak

(10) Patent No.: US 9,902,914 B2
(45) Date of Patent: Feb. 27, 2018

(54) CONFIGURATIONS AND METHODS FOR PROCESSING HIGH PRESSURE ACID GASES WITH ZERO EMISSIONS

(71) Applicant: Fluor Technologies Corporation, Aliso Viejo, CA (US)

(72) Inventor: John Mak, Santa Ana, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 62 days.

(21) Appl. No.: 14/924,311

(22) Filed: Oct. 27, 2015

(65) Prior Publication Data

US 2017/0114295 A1    Apr. 27, 2017

(51) Int. Cl.
| | |
|---|---|
| *B01D 53/14* | (2006.01) |
| *C01B 17/04* | (2006.01) |
| *C10L 3/10* | (2006.01) |

(52) U.S. Cl.
CPC .......... *C10L 3/104* (2013.01); *C01B 17/0408* (2013.01); *C10L 3/102* (2013.01);
(Continued)

(58) Field of Classification Search
CPC ............. C01B 17/0408; C10L 2290/12; C10L 2290/541; C10L 3/102; C10L 3/103;
(Continued)

(56) References Cited

U.S. PATENT DOCUMENTS

| 2,177,068 A | 10/1939 | Hutchinson |
|---|---|---|
| 2,649,166 A | 8/1953 | Porter et al. |

(Continued)

FOREIGN PATENT DOCUMENTS

| WO | 2005/035101 A1 | 4/2005 |
|---|---|---|
| WO | 2008/103467 A1 | 8/2008 |

(Continued)

OTHER PUBLICATIONS

PCT Application No. PCT/US15/57638, International Search Report and Written Opinion, dated Jul. 27, 2016, 13 pages.

*Primary Examiner* — Cabrena Holecek
(74) *Attorney, Agent, or Firm* — Conley Rose, P.C.

(57) ABSTRACT

Plants, processes, and methods for reducing the $H_2S$ and $CO_2$ contents of shale gasses from fields that produce shale gasses having varying $H_2S$ and $CO_2$ contents are provided. Acid gas enters an absorber and is scrubbed using a lean physical solvent, producing a treated gas and a rich physical solvent. The $H_2S$ content of the treated gas is further reduced in an amine absorber, producing a pipeline gas and a semi-lean amine. The pipeline gas contains lower levels of $H_2S$ and $CO_2$ than gas produced using a polishing bed. A physical solvent regeneration unit regenerates the lean physical solvent from the rich physical solvent for feeding into the absorption unit. An amine regeneration unit regenerates the lean amine from the semi-lean amine for feeding into the amine absorber. Contemplated plants may further comprise a Claus Unit or a Redox unit for oxidizing $H_2S$ to elemental sulfur.

18 Claims, 3 Drawing Sheets

(52) U.S. Cl.
CPC ........... *C10L 3/103* (2013.01); *C10L 2290/12* (2013.01); *C10L 2290/541* (2013.01)

(58) Field of Classification Search
CPC ..... C10L 3/104; B01D 53/14; B01D 53/1425; B01D 53/1456; B01D 53/1475
See application file for complete search history.

(56) References Cited

U.S. PATENT DOCUMENTS

| | | |
|---|---|---|
| 2,863,527 A | 12/1958 | Herbert et al. |
| 2,926,751 A | 3/1960 | Kohl et al. |
| 3,505,784 A | 4/1970 | Hochgesand |
| 3,563,695 A | 2/1971 | Benson |
| 3,773,896 A | 11/1973 | Preusser et al. |
| 4,372,925 A * | 2/1983 | Cornelisse ......... B01D 53/1456 423/226 |
| 5,411,721 A | 5/1995 | Doshi et al. |
| 6,001,153 A | 12/1999 | Lebas et al. |
| 7,192,468 B2 | 3/2007 | Mak et al. |
| 7,556,671 B2 | 7/2009 | Jain et al. |
| 7,637,987 B2 | 12/2009 | Mak |
| 7,662,215 B2 | 2/2010 | Sparling et al. |
| 7,879,135 B2 | 2/2011 | Ravikumar et al. |
| 2006/0110305 A1 | 5/2006 | Van De Graaf |
| 2007/0028764 A1 | 2/2007 | Wittrup et al. |
| 2010/0111784 A1* | 5/2010 | Mak ................... B01D 53/1406 422/600 |
| 2011/0168019 A1 | 7/2011 | Northrop et al. |
| 2011/0296992 A1 | 12/2011 | Scialdone |
| 2012/0000359 A1 | 1/2012 | Bresler et al. |
| 2012/0097027 A1 | 4/2012 | Gunther |
| 2012/0204599 A1 | 8/2012 | Northrop et al. |

FOREIGN PATENT DOCUMENTS

| | | |
|---|---|---|
| WO | 2010/039785 A1 | 4/2010 |
| WO | 2010/111337 A1 | 9/2010 |
| WO | 2011/034993 A1 | 3/2011 |
| WO | 2011/041361 A1 | 4/2011 |

* cited by examiner

CONFIGURATIONS AND METHODS FOR PROCESSING HIGH PRESSURE ACID GASES WITH ZERO EMISSIONS

FIELD OF THE INVENTION

The field of the invention is removal of acid gases from high pressure feed gasses that have high $CO_2$ and $H_2S$ content, the production of a pipeline quality gas, the production of a high $H_2S$ content stream that can be processed by a sulfur plant, and the production of a concentrated $CO_2$ stream for sequestration or enhanced oil recovery (EOR).

BACKGROUND

The following description includes information that may be useful in understanding the present invention. It is not an admission that any of the information provided herein is prior art or relevant to the presently claimed invention, or that any publication specifically or implicitly referenced is prior art.

The gas processing industry faces challenges in treating natural gas with high acid gas content from unconventional gas fields, such as the coalbed methane, tight sandstones, and methane hydrates. Recently higher gas prices and improved drilling technology have spurred shale gas drilling across the world. However, shale gas also contains significant amounts of $H_2S$ and $CO_2$, which must be removed. $CO_2$ is a by-product of shale gas production, and the $CO_2$ level typically steadily increases during a well's productive life, from below 10 mole % to over 30 mole %. In areas where $CO_2$ is used for flooding for enhanced oil recovery, the $CO_2$ level can further increase to over 50%. Moreover, the $H_2S$ and $CO_2$ contents of shale gas vary from field to field, posing major challenges to the gas processors in meeting today's emission requirements.

While these plants must operate economically, they must also comply with environmental regulations (e.g., with respect to greenhouse gas and sulfur emissions) and stringent energy efficiency requirements and standards. Removal and compression of the $CO_2$ content for sequestration requires significant amount of capital and operating expenditure, which may render processing the high pressure sour/acid gas field uneconomical.

There are numerous acid gas removal methods that can be used to treat shale gas. For example, a chemical solvent can be used that reacts with acid gas to form a (typically non-covalent) complex with the acid gas. In processes involving a chemical reaction between the acid gas and the solvent, feed gas is typically scrubbed with an alkaline salt solution of a weak inorganic acid, for example, described in U.S. Pat. No. 3,563,695, or with alkaline solutions of organic acids or bases as, for example, described in U.S. Pat. No. 2,177,068. While chemical solvents are suitable to remove acid gases to very low levels, they require large heating and cooling duties which increase proportionally with the partial pressure of acid gases. Hence, the chemical solvent processes are generally uneconomical for treating feed gas with high partial pressure of $CO_2$ (e.g., operating pressure greater than 600 psig with greater than 10% $CO_2$ content).

To overcome these problems, extraction of $CO_2$ using physical solvents is more suitable, because according to Henry's law, the concentration of acid gas in the solvent increases with the acid gas partial pressure. Thus, physical solvent absorption of acid gas is attractive for high acid gas fields and can accommodate variations in $CO_2$ content of feed gases. Moreover, solvent regeneration can be accomplished, by flash regeneration that eliminates the need for heating and so reduces greenhouse gas emissions. However, without external heating, the physical solvent can only be partially regenerated and is therefore generally unsuitable for treatment of sour/acid gases to produce a product that meets pipeline gas specifications (e.g., 1 mol % $CO_2$, 4 ppmv $H_2S$). For example, when conventional physical solvent processes are used for treatment of a feed gas with high $H_2S$ content (e.g., ≥100 ppmv), the treated gas typically exceeds $H_2S$ limits. To improve the treated gas quality, a sulfur scavenger bed can be used to adsorb additional $H_2S$ from the treated gas. However, such scavenger beds may also present problems when the residual $H_2S$ content is excessive. For example, large amounts of spent sulfur contaminated beds are often environmentally unacceptable to dispose of and handle.

The physical absorption of acid gases is further dependent upon the solvent's physical properties, pressures, temperatures, and feed gas compositions. For example, methanol may be used as a low-boiling organic physical solvent, as exemplified in U.S. Pat. No. 2,863,527. However, such solvent operates at cryogenic temperature (−80° F.) necessary to enhance absorption and reduce solvent losses. These processes typically require significantly higher electric power to operate the refrigeration unit, which are known to be very high on capital and operating costs.

Other physical solvents are available that can be operated at ambient or mildly refrigerated temperatures (0° F. or lower), including propylene carbonates as described in U.S. Pat. No. 2,926,751 and N-methylpyrrolidone or glycol ethers as described in U.S. Pat. No. 3,505,784. The selection of the physical solvent depends on the application requirements. For example, propylene carbonate is most suitable to remove $CO_2$, but it is not $H_2S$ selective and cannot meet low $H_2S$ specifications (below 4 ppmv). To some extent, residual $H_2S$ from the propylene carbonate unit can be removed using a sulfur scavenger bed as disclosed in WO 2011/041361 "Gas Purification Configurations and Methods", to meet the requirement, the process is limited to a small quantity of $H_2S$ in the feed gas, and is uneconomical for typical sour gas fields.

In further known methods, physical solvents with higher $H_2S$ absorption capacity include ethers of polyglycols, and specifically dimethoxytetraethylene glycol as shown in U.S. Pat. No. 2,649,166, or N-substituted morpholine as described in U.S. Pat. No. 3,773,896. While use of the $H_2S$ selective solvents can be used to meet today's $H_2S$ specification, various difficulties still exist. Among other things, solvent circulation can be excessive and the power consumption and heating requirement can be very high, consequently making the processing uneconomical.

Thus, although various configurations and methods are known to remove acid gases from a feed gas, all or almost all of them suffer from one or more disadvantages. Among other disadvantages, while physical solvents are suitable to treat high pressure sour gases, they all fail to economically treat variable $H_2S$ and $CO_2$ contents feed gases, to meet today's environmental requirements on greenhouse gas and the zero emission requirements. Therefore, there is still a need to provide improved methods and configurations for acid gas removal.

This application relates to U.S. patent application Ser. No. 10/511,408, now U.S. Pat. No. 7,637,987; U.S. Pat. No. 7,192,468; and U.S. patent application Ser. No. 13/496,302, which claims priority to U.S. Provisional Pat. App. No. 61/243,969, all of which are incorporated by reference herein. These and all other publications cited herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The present invention is directed to plants, processes, and methods of removing $CO_2$ and $H_2S$ from a feed gas that include (1) an absorption unit configured to (i) receive a feed gas comprising $H_2S$ and $CO_2$ and (ii) use a lean physical solvent to absorb a portion of $H_2S$ and $CO_2$ within the feed gas to produce a treated gas and a rich physical solvent; (2) an amine absorber coupled to the absorption unit and configured to (i) receive the treated gas from the absorption unit and (ii) use a first portion of a lean amine to absorb a portion of $H_2S$ and $CO_2$ within the treated gas to produce a pipeline gas and a rich or semi-lean amine; (3) a physical solvent regeneration unit coupled to the absorption unit and configured to (i) receive the rich physical solvent from the absorption unit and (ii) regenerate the lean physical solvent from the rich physical solvent for feeding into the absorption unit; and (4) an amine regeneration unit coupled to the amine absorber and configured to (i) receive the rich or semi-lean amine from the amine absorber and (ii) regenerate the lean amine from the rich or semi-lean amine for feeding into the amine absorber.

In preferred methods, first, acid gasses ($CO_2$ and $H_2S$) are removed in an absorption unit employing a lean physical solvent (e.g., FLUOR™ SOLVENT (propylene carbonate), NMP (normal-methyl pyrolidone), SELEXOL™ (dimethyl ether of polyethylene glycol), TBP (tributyl phosphate), and polyethylene glycol dialkyl ethers) producing a treated gas.

Second, residual acid gas is removed from the treated gas using an amine absorber using an amine (e.g., N-methyl-diethanolamine (MDEA), diisopropanolamine (DIPA), a hindered amine, or other formulated tertiary amines). The acid gases removed from both units are further concentrated in an acid gas enrichment unit using additional amine absorbers or a redox unit. The concentrated $CO_2$ can be further compressed for sequestration or EOR. The $H_2S$ stream is suitable for oxidation to sulfur (e.g., using the Claus process).

Typically, the physical solvent regeneration unit comprises (i) a first separator that is configured to produce a first flashed gas as a byproduct of regenerating a first semi-lean physical solvent from the rich physical solvent, and (ii) a second separator that is configured to produce a second flashed gas as a byproduct of regenerating a second semi-lean physical solvent from the first semi-lean physical solvent.

In further aspects of the inventive subject matter, the amine regeneration unit comprises a fuel gas scrubber that is configured to (i) receive the first flashed gas and (ii) use a second portion of the lean amine to scrub the first flashed gas to produce a fuel gas and a rich amine.

Thus, exemplary plants have an amine regeneration unit that comprises a regenerator that is configured to (i) receive the rich amine from the fuel gas scrubber and (ii) produce an $H_2S$ rich stream as a byproduct of regenerating the lean amine from the rich amine. The amine regeneration unit may further comprise a second amine absorber that is configured to (i) receive the second flashed gas from the second separator and (ii) use a third portion of the lean amine to produce a $CO_2$ rich stream and a rich amine. Moreover, the amine regeneration unit may include a regenerator that is configured to (i) receive the rich amine from the second amine absorber and (ii) produce an $H_2S$ rich stream as a byproduct of regenerating the lean amine from the rich amine.

Therefore, contemplated plants that extract less than 10 tons of sulfur per day, may optionally include a redox unit that is configured to (i) receive a portion of the $H_2S$ rich stream from the regenerator and the flashed gas from at least one of the second and third separators of the physical solvent regeneration unit and (ii) apply an iron-chelate solution to convert the $H_2S$ to elemental sulfur and to produce a $CO_2$ rich stream.

In further aspects of the inventive acid gas processing plant, when greater than 10 tons of sulfur per day must be removed, a Claus unit can be configured to receive a portion of the $H_2S$ rich stream from the regenerator to produce elemental sulfur.

Most typically, the acid gas enrichment unit is integrated with an amine absorber such that the residual $H_2S$ and/or $CO_2$ content of the treated gas is further reduced to produce a pipeline gas with less than 4 ppmv $H_2S$, more preferably less than 2 ppmv $H_2S$, and less than one mole percent (10,000 ppmv) $CO_2$, more preferably 500 ppmv or less $CO_2$.

In even more preferred configurations, the semi-lean amine from the amine absorber is used to remove acid gas from a first flashed gas from the first separator in the physical solvent regeneration unit, producing a fuel gas for the plant and a rich amine.

In another aspect of the inventive subject matter, the amine regeneration unit comprises a second amine absorber that (i) receives the second flashed gas from the second separator and (ii) use a third portion of the lean amine to produce a $CO_2$ rich stream and a rich amine. The $CO_2$ rich stream is compressed for enhanced oil recovery (EOR) or sequestration.

In yet further aspects, the amine regeneration unit includes a regenerator that concentrates the acid gasses accumulated in the rich amine to produce an $H_2S$ rich stream and regenerates the lean amine. The $H_2S$ rich stream can then be sent to a Claus unit or other sulfur plant.

Another preferred embodiment employs a redox unit that (i) receives a portion of the $H_2S$ rich stream from the regenerator and the second flashed gas from the second separator and (ii) applies an iron-chelate to the $H_2S$ rich stream and the second flashed gas to produce elemental sulfur and a $CO_2$ rich stream. The $CO_2$ rich stream to be compressed for EOR or sequestration.

While numerous feed gas compositions are deemed suitable for use in conjunction with the teachings presented herein, the inventive plant, processes, and methods are suitable for processing feed gasses that comprise at least 10 mol %, and most preferably 30 mol % and higher $CO_2$, and at least 0.01 mole % (100 ppmv) and most preferably at least 0.5 mole % $H_2S$. The treated gas from the physical solvent unit typically contains 2% $CO_2$ and 10 ppmv or higher $H_2S$. After treatment in the amine absorber, the pipeline gas generally contains less than 4 ppmv $H_2S$ and less than 1000 ppmv $CO_2$, and preferably less than 1 ppmv $H_2S$ and less than 500 ppmv $CO_2$.

Various objects, features, aspects and advantages of the inventive subject matter will become more apparent from the following detailed description of preferred embodi-

DETAILED DESCRIPTION

The inventive plants, processes, and methods produce pipeline gas superior to the pipeline gas produced by prior art processes. Lower contents of both $H_2S$ and $CO_2$ in the product pipeline gas can be obtained. Typically, $H_2S$ content is reduced from 100 ppmv to less than 4 ppmv, and more typically less than 1 ppmv. The $CO_2$ content of acid gas can be reduced from 10-50 mole percent (10,000 to 50,000 ppmv) to less than 1000 ppmv, and preferably less than 500 ppmv. Thus, contemplated plants, processes, and methods are able to produce pipeline gas from shale gasses having a wider range of $H_2S$ and $CO_2$ contents than prior art methods could economically achieve.

Moreover, the flow of the flashed gas streams from the physical solvent regeneration unit to the amine regeneration and acid gas enrichment units efficiently recycles the physical solvent and amine. The concentrated $H_2S$ stream can be sent to a Claus unit to produce sulfur. The inventors further contemplate that acid gasses having low concentrations of $H_2S$ can be purified in plants that use a redox unit to produce elemental sulfur and a concentrated $CO_2$ stream. Advantageously, rather than being released into the environment as in prior art acid gas treatment processes, $CO_2$ is captured and can be compressed for sequestration or use in enhanced oil recovery processes.

Figure 1:
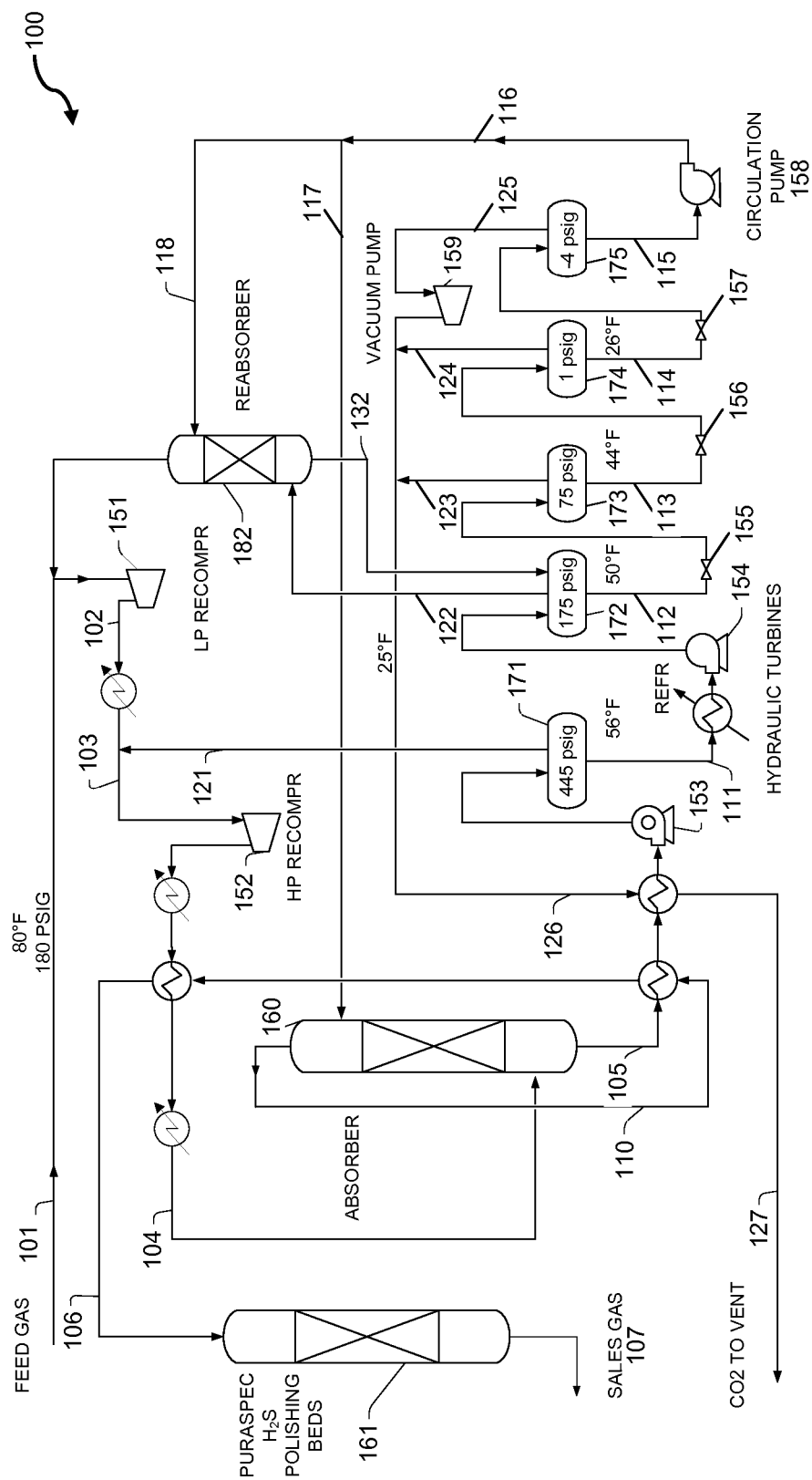
FIG. 1 is an exemplary schematic for an acid gas removal process using a physical solvent absorber in a plant according to the prior art.

One conventional process flow schematic 100 is shown in FIG. 1. Mak, J. Y., Row, A. R., Varnado, C. (Apr. 15-18, 2012) *Production of Pipeline Gas from a Raw Gas with a High and Variable Acid Gas Content*, paper presented at the 91$^{st}$ Annual GPA Convention, New Orleans, La., USA. Typically, feed gas 101 contains about 36 mole % to 53 mole % (36,000-53,000 ppmv) $CO_2$ and about 70 ppmv to 100 ppmv or higher $H_2S$. In some embodiments, the numbers expressing quantities of ingredients, properties such as concentration, reaction conditions, and so forth, used to describe and claim certain embodiments of the inventive subject matter are to be understood as a figure being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

Feed gas stream 101 is first compressed by the low pressure compressor 151 ("LP RECOMPR"), from 180 psig (and 80° F.) to about 450 psig, forming stream 102. Stream 102 is then cooled and combined with flashed gas stream 121 (445 psig). The combined gases, stream 103, are further compressed by the high pressure compressor 152 ("HP RECOMPR") to about 660-950 psig, and then chilled to about 70° F., forming stream 104. Gas chilling is achieved by heat exchange against the cold treated gas, and the use of external refrigeration.

Stream 104 enters solvent absorber 160, which operates between 650 and 900 psig. The rich solvent stream 105, is chilled by the overhead gas stream 110 and the cold vent gas stream 126 and then let down in pressure to 445 psig in the first stage hydraulic turbine 153. Flashed gas stream 121 is then separated from the two-phase chilled rich solvent stream 105 in separator 171. The flashed gas stream 121 is combined with chilled stream 102, forming stream 103 as described above. Stream 103 is compressed and recycled back to the absorber 160 for recovery.

The flashed rich solvent, stream 111, is further chilled with refrigeration and let-down in pressure to 175 psig in a second stage hydraulic turbine 154. The hydraulic turbines generate a significant amount of cooling which reduces the refrigeration demand, while at the same time, generating power to operate the solvent pumps.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

To further reduce hydrocarbon losses, flashed vapor stream 122 from separator 172 is treated in reabsorber 182. Reabsorber 182 uses slipstream of lean solvent, stream 118, to reabsorb $CO_2$ from the flash gas while recycling hydrocarbons back to absorber 160. With the reabsorption process, the vent gas stream 126 is more concentrated in $CO_2$ and its hydrocarbon content is reduced to less than 2 mole % (20,000 ppmv), which is the limit of the plant's volatile organic chemicals ("VOC") emission permits. The $CO_2$ vent gas stream 127, containing a majority of the $CO_2$, $H_2S$, and VOC, could previously be sent to the atmosphere without sequestration. However, such $CO_2$, $H_2S$, and VOC concentrations are not acceptable under today's emission limits for vent gas streams.

The reabsorber bottom stream 132, is let down in pressure sequentially in three separators: separator 173 (operating at 75 psig), separator 174 (1 psig), and separator 175 (−4 psig). The vacuum in the last flash stage, separator 175, is maintained by vacuum pump 159. The physical solvent regeneration unit produces a sales gas stream 107 with a $CO_2$ content of about 2.0 mole %, and a $H_2S$ content varying from 6 to 10 ppmv. In order to meet the 4 ppmv $H_2S$ pipeline specification, a sulfur scavenger bed 161 (e.g., PURASPEC® $H_2S$ polishing beds), is typically installed downstream of the physical solvent unit.

Although sales gas stream 107 can meet pipeline specifications after purification in the sulfur scavenger beds 161, the hydrocarbon and $H_2S$ content in $CO_2$ vent gas stream 127 are high. Current regulations require that vent streams meet desirable environmental limits of $H_2S$, VOC, and $CO_2$, which requires further conditioning in additional processing facilities.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 2:
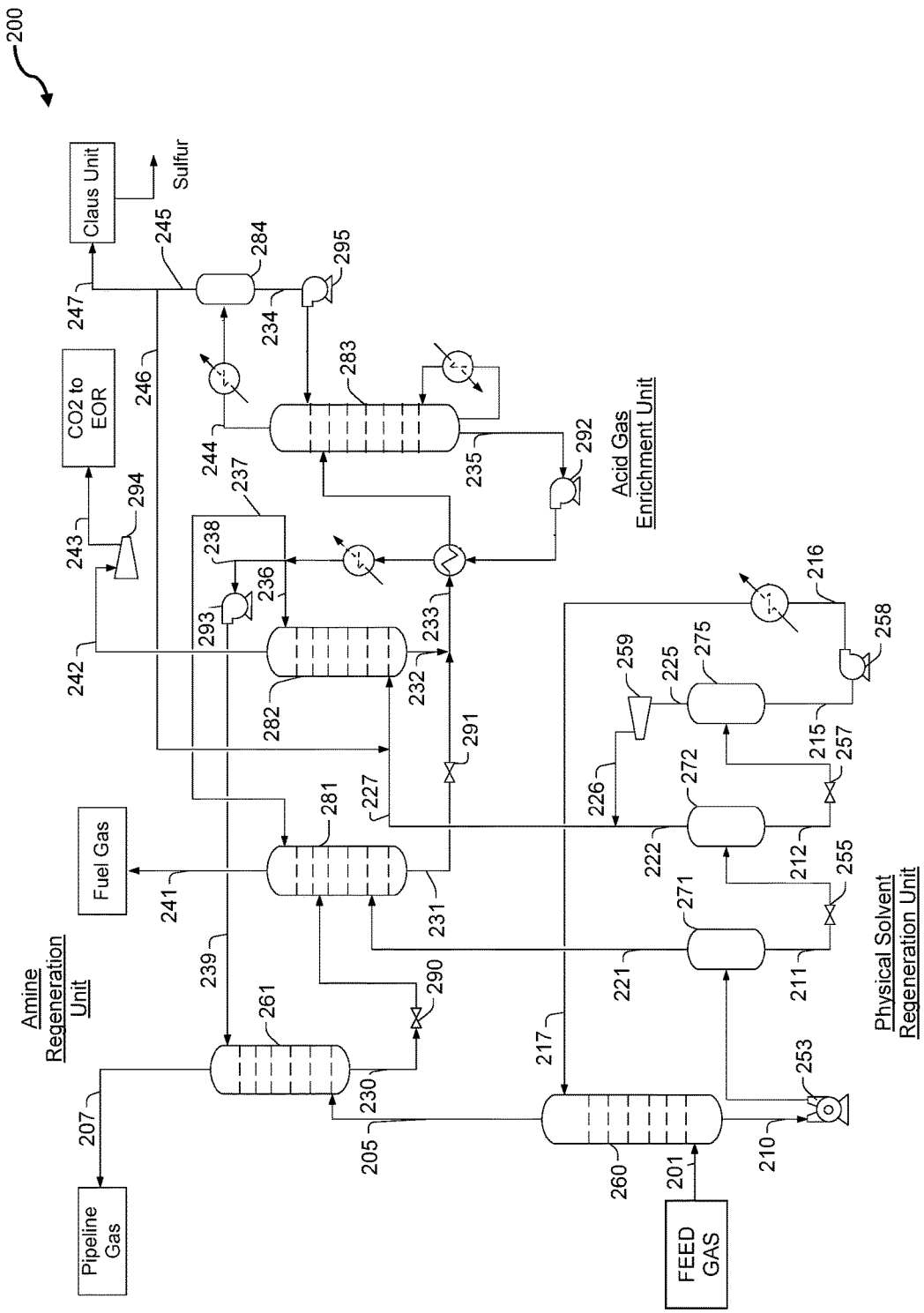
FIG. 2 is an exemplary schematic for an acid gas removal process using a physical solvent absorption unit and an amine absorber in a plant to achieve zero emissions according to the inventive subject matter.

FIG. 2 illustrates a process flow schematic of acid gas processing plant 200, an exemplary embodiment of an acid gas processing plant that is consistent with the inventive subject matter. Optionally, feed gas 201 can be cooled and dried to remove any free water, which would otherwise form hydrates in absorption unit 260. Feed gas 201, typically contains 10 to over 50 mole % $CO_2$ and about 100 ppmv to over 0.5 mole % (5,000 ppmv) $H_2S$ and is fed to the absorption unit 260 at about 100° F. and about 600-1000 psig. Preferably, feed gas 201 is fed to absorption unit 260 at a pressure of at least 400 psig, more preferably at least 1000 psig, even more preferably at least 1200 psig. In further regard to feed gas 201, it should be appreciated that the pressure and composition of feed gas 201 will in part determine the pressure in the sequent flash drums downstream of the absorption unit 260.

Absorption unit 260 typically receives acid gasses that have higher $CO_2$ and $H_2S$ concentrations than can be economically processed in conventional acid gas treatment processes. Feed gas 201 is then scrubbed by a countercurrent of lean solvent, stream 217, at about −15° F., producing a treated gas 205, at about −10° F. and a rich physical solvent 210 at about −1° F. Preferred solvents for use in absorption unit 260 include FLUOR SOLVENT™ (propylene carbonate), NMP (normal-methyl pyrolidone), SELEXOL™ (dimethyl ether of polyethylene glycol), TBP (tributyl phosphate), and polyethylene glycol dialkyl ethers, because such solvents typically do not require external heating for solvent regeneration, minimizing greenhouse gas emissions. Alternatively, other solvents including enhanced tertiary amine (e.g., Piperazine), other solvents, or mixtures of solvents that have high acid-gas capacities may be employed as solvents. Most typically, the absorber contains contacting devices, including packings, trays, or other suitable media for acid gas absorption.

Therefore, in one preferred embodiment of the inventive subject matter, an absorption unit removes at least a portion, and preferably the bulk, of the acid gases from a feed gas using a lean physical solvent, producing a treated gas and a rich physical solvent. An advantage of the inventive subject matter is that the absorption unit can be operated without any external heat input, thereby minimizing the carbon footprint of the bulk acid gas removal unit. Additionally, the rich physical solvent is regenerated in a physical solvent regeneration unit coupled to the absorption unit. Preferably the physical regeneration unit comprises multi-stage flash regeneration separators. Advantageously, the flashed gases can be concurrently recovered in amine absorbers.

Depending on the $H_2S$ and $CO_2$ content of feed gas 201, the residual $H_2S$ in treated gas 205 can range from 10 ppmv to over 1000 ppmv. Treated gas 205 typically contains about 2 mol % (20,000 ppmv) $CO_2$ and about 6-100 ppmv or higher $H_2S$. Sulfur scavenger beds can be used for polishing gas with low $H_2S$ content (e.g., less than 10 ppmv). However, when the $H_2S$ content exceeds 100 ppmv, generally the use of sulfur scavenger beds is not economical, and it is more effective to remove residual $H_2S$ using an amine absorber.

Treated gas 205 is fed to amine absorber 261, which is coupled to absorption unit 260 and further reduces the $H_2S$ content to below 4 ppmv (preferably below 1 ppmv) and the $CO_2$ content to 1000 ppmv (preferably below 500 ppmv) such that pipeline gas 207 meets sales gas specifications. It should be appreciated that the pipeline gas so produced has superior purity to the sales gas produced using conventional polishing beds, which typically has 2.0 mol % $CO_2$ and 4 ppmv $H_2S$. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Rich physical solvent 210 is letdown in pressure via hydraulic turbine 253 to about 350-750 psig (and −8° F.). In the physical solvent regeneration unit, the letdown stream is separated in first separator 271, producing first flashed gas 221 and a first semi-lean physical solvent 211. First flashed gas 221 is treated in fuel gas scrubber 281 using a second portion of the lean amine 237 from second amine absorber 282 and the semi-lean amine 230 to produce fuel gas 241. Fuel gas 241 can be used to power operations in the plant, improving the efficiency of the plant.

First semi-lean physical solvent 211 is letdown in pressure via JT valve 255 to atmospheric pressure. It should be noted that the multi-stage flash stages can be used to further reduce energy consumption. The letdown first semi-lean physical solvent 211 is then separated in second separator 272, producing second flashed gas 222 and second semi-lean physical solvent 212. Second semi-lean physical solvent 212 is letdown in pressure using JT valve 257, to about 2-5 psia (and −10° F.). The letdown second semi-lean physical solvent 212 is separated in separator 275, producing a vacuum flashed third flashed gas 225 and a vacuum flashed lean physical solvent 215, which is pumped by solvent circulation pump 258, forming lean physical solvent 216. A chiller cools lean physical solvent 216, forming lean physical solvent stream 217, which can be recycled into absorption unit 260. The vacuum pressure is maintained by a vacuum pump or compressor 259. Third flashed gas 225 is compressed by compressor 259, giving fourth flashed gas 226 that is combined with second flashed gas 222 from second separator 272. Combined flashed gas 227 is then fed to second amine absorber 282 of the acid gas enrichment unit.

It should be appreciated, that flashing of rich physical solvent 210 may be performed using numerous devices, and all pressure reduction devices are suitable for use herein.

With respect to the magnitude of pressure reduction, preferred reduced pressures release flashed vapors having a methane content of about 20-70 mole %. These vapors are most preferably treated in fuel gas scrubber 281 to produce fuel gas for the plant, thereby recovering hydrocarbons fuels. Accordingly, $CO_2$ rich combined flashed gas 227 produced from vacuum flash stages typically contains less than 5 mole % C4+ hydrocarbons, and more preferably less than 1%, which is suitable for EOR.

The acid gas enrichment unit, in combination with the amine regeneration unit, regenerates lean amine 239 (and 235-238), produces a concentrated $CO_2$ rich stream 243 (and 242), and a concentrated $H_2S$ rich stream 247 (and 245, 246). $CO_2$ rich stream 243 can be sequestered or used for EOR. Additionally, $H_2S$ rich stream 247 can be used for sulfur production. Therefore, the inventive plants and processes meet emission regulations that conventional waste streams fail to meet.

Treated gas 205 from absorption unit 260 is treated in amine absorber 261 using lean amine 239. Because the acid gas loading in treated gas 205 is very low, the acid gas concentrations in semi-lean amine 230 are also very low, and semi-lean amine 230 can be used to purify first flashed gas 221 in fuel gas scrubber 281. Semi-lean amine 230 is letdown in pressure in valve 290 and fed to the mid-section of fuel gas scrubber 281. Fuel gas 241 is polished with lean amine 237 to meet fuel gas $H_2S$ specifications. Rich amine stream 231 is letdown in pressure in JT valve 291, combined with rich amine 232 to form rich amine 233, which is fed to a lean-rich heat exchanger.

The inventors contemplate plants, processes, and methods for selective $H_2S$ absorption and sulfur recovery from gases comprising various $H_2S$ and $CO_2$ concentrations, and especially from gases in which $H_2S$ is dilute. Contemplated plants also optionally include an integrated sulfur plant (e.g., Claus plant) that receives $H_2S$ rich stream 247, a portion of $H_2S$ rich stream 245. In further aspects of contemplated plants and processes, a Claus plant provides a tail gas to the plant from which any $H_2S$ is reabsorbed by a physical solvent or amine as described above.

Suitable solvents for use in the inventive plants, processes, and methods are selective towards hydrogen sulfide, and most preferably include tertiary amines, activated amines, sterically hindered amines, and/or complex amines. For example, MDEA, DIPA, hindered amine, or other formulated tertiary amines are preferred $H_2S$ selective solvents.

In further aspects of the inventive subject matter, contemplated processes are particularly advantageous in the treatment of treated sour gases having relatively low $H_2S$ concentrations and relatively high $CO_2$ concentrations, as in combined flash gas 227. Exemplary gas streams typically have $H_2S$ contents of 20% or less, more typically 15% or less, even more typically 10% or less, and most typically 7% or less $H_2S$. With respect to the $CO_2$ contents, gasses comprising 80% or greater $CO_2$, more typically 85% or greater $CO_2$, even more typically 90% or greater $CO_2$, and most typically 93% or greater $CO_2$ are contemplated. Therefore, suitable gas streams may include acid gases from various processes, including natural gas processing, hydrocarbon refining processes, gasification of residual oil or coke, coking operations, gas treating unit operations, etc.

Depending on the source of the acid gas stream, the $H_2S$ concentration in second flashed gas 222 from the physical solvent regeneration unit may be too low for use in a downstream Claus process. Additionally, combined flash gas 227 may further include other components such as, benzene, toluene, xylene, including heavy hydrocarbons, and/or $CO_2$ at relatively high concentrations, any of which may interfere with Claus catalysts. Therefore, the use and/or disposal of such acid gases presents a problem.

To enrich combined flash gas 227 in $H_2S$, it is fed to second amine absorber 282 at 120° F. and 10 psig and is scrubbed with lean amine 236, a third portion of lean amine stream 235. In order to meet emission requirements, the $H_2S$ content of $CO_2$ rich stream 242 is typically less than 150 ppmv (preferably less than 120 ppmv, more preferably less than 100 ppmv, and most preferably less than 75 ppmv). The $CO_2$ content of $CO_2$ rich stream 242 is typically enriched to over 99.0 mole %, more preferably at least 99.9% or higher. The CO2 stream is compressed by $CO_2$ compressor 294 to about 3000 psig, forming a high pressure $CO_2$ rich stream 243, which can be used for enhanced oil recovery or sequestration.

In a preferred embodiment, lean amine 236 comprises 40% to 50% MDEA, although other solvents such as DIPA, hindered amine, or other formulated tertiary amines are contemplated. Second amine absorber 282 preferably includes at least as many trays required to achieve the desired reduction in $H_2S$ concentration, typically about 12-18 trays. Depending on the gas composition of combined flash gas 227, the flow rate of lean amine 236, and other parameters, at least 75%, more typically at least 85%, and most typically at least 95% of the feed gas $CO_2$ is not dissolved in lean amine 236 and remains in $CO_2$ rich stream 242.

Generally, rich amine 232 exits the bottom of second amine absorber 282 at 150-170° F. and combines with rich amine stream 231, forming rich amine 233. Rich amine 233 is heated in the lean-rich exchanger using heat from lean amine 235. Rich amine 233 is heated to about 210° F. and enters the top of regenerator 283.

Regenerator 283 uses an appropriate number of stripping trays to regenerate the lean amine, typically about 20 or more stripping trays. Alternatively, other contacting devices such as packing can be used. Regenerator 283 also generally includes a wash section for removing the entrained acid gasses from the overhead stream. The $H_2S$ in rich amine 233 is stripped with heat applied at the bottom reboiler of regenerator 283, producing $H_2S$ rich stream 244 and lean amine 235. Lean amine 235 is pumped by lean amine pump 292 to about 50 psig. The heat in lean amine 235, which is typically at 260° F., is recovered in the lean/rich exchanger. Lean amine 235 is further cooled with a cooler to 100-110° F. Ambient air, cooling water, or chilled water can be used for this cooling step.

Preferred processes improve the selectivity of $H_2S$ absorption by maintaining the cooler outlet temperature as low as possible, preferably 60-80° F., because lower temperatures favor the $H_2S$ absorption and disfavors the $CO_2$ absorption. Cooled lean amine 235 is split into three portions: lean amine 236, lean amine 237, and lean amine 238. Lean amine 236 is fed to second amine absorber 282, lean amine 237 is fed to fuel gas scrubber 281, and lean amine 238 is further pumped by lean amine pump 293 to about 650-1000 psig, forming lean amine 239, which is fed to amine absorber 261.

$H_2S$ rich stream 244 is cooled in the overhead cooler and separated in reflux drum 284, forming a liquid stream 234 and gaseous $H_2S$ rich stream 245. Stream 234, predominantly comprises water and is pumped by reflux pump 295 to regenerator 283. The enriched $H_2S$ rich stream 245 is split into two portions, $H_2S$ rich stream 246 and $H_2S$ rich stream 247. $H_2S$ rich stream 246 is recycled back to second amine absorber 282 for further enrichment, and $H_2S$ rich stream 247 is sent to a Claus unit (or other sulfur plant). To provide an optimum concentrated H$_2$S stream to the sulfur plant while minimizing the size of the amine regeneration unit/acid gas enrichment unit, H$_2$S content of H$_2$S rich stream 245 can be modulated by adjusting the recycle flow of H$_2$S rich stream 246. The recycle flow of H$_2$S rich stream 246 is determined by optimizing the capital and operating costs of the sulfur plant and the amine regeneration and acid gas enrichment units.

The volume of H$_2$S rich stream 246 is typically between about 15-90% of the volume of H$_2$S rich stream 245, preferably about 25-75% of the volume of H$_2$S rich stream 245, although the specific volume of H$_2$S rich stream 246 primarily depends on the H$_2$S concentration of feed gas 201. For example, when the H$_2$S content feed gas 201 is low and thus also low in combined flash gas 227, higher flow volumes for H$_2$S rich stream 246 (75% of H$_2$S rich stream 245, and even higher) may be necessary. The flow volumes of H$_2$S rich stream 246 can be reduced to about 25% (and even less) when the H$_2$S concentration in the feed gas is higher. From most feed gasses, enrichment to about 75% H$_2$S in H$_2$S rich stream 245 can be achieved. In addition, it should be appreciated that over 90% of the hydrocarbons and benzene, toluene, and/or xylene components accumulate in the CO$_2$ rich streams. The H$_2$S enrichment and the absence of benzene, toluene, and/or xylene in the enriched acid gas are greatly beneficial to the Claus unit.

Figure 3:
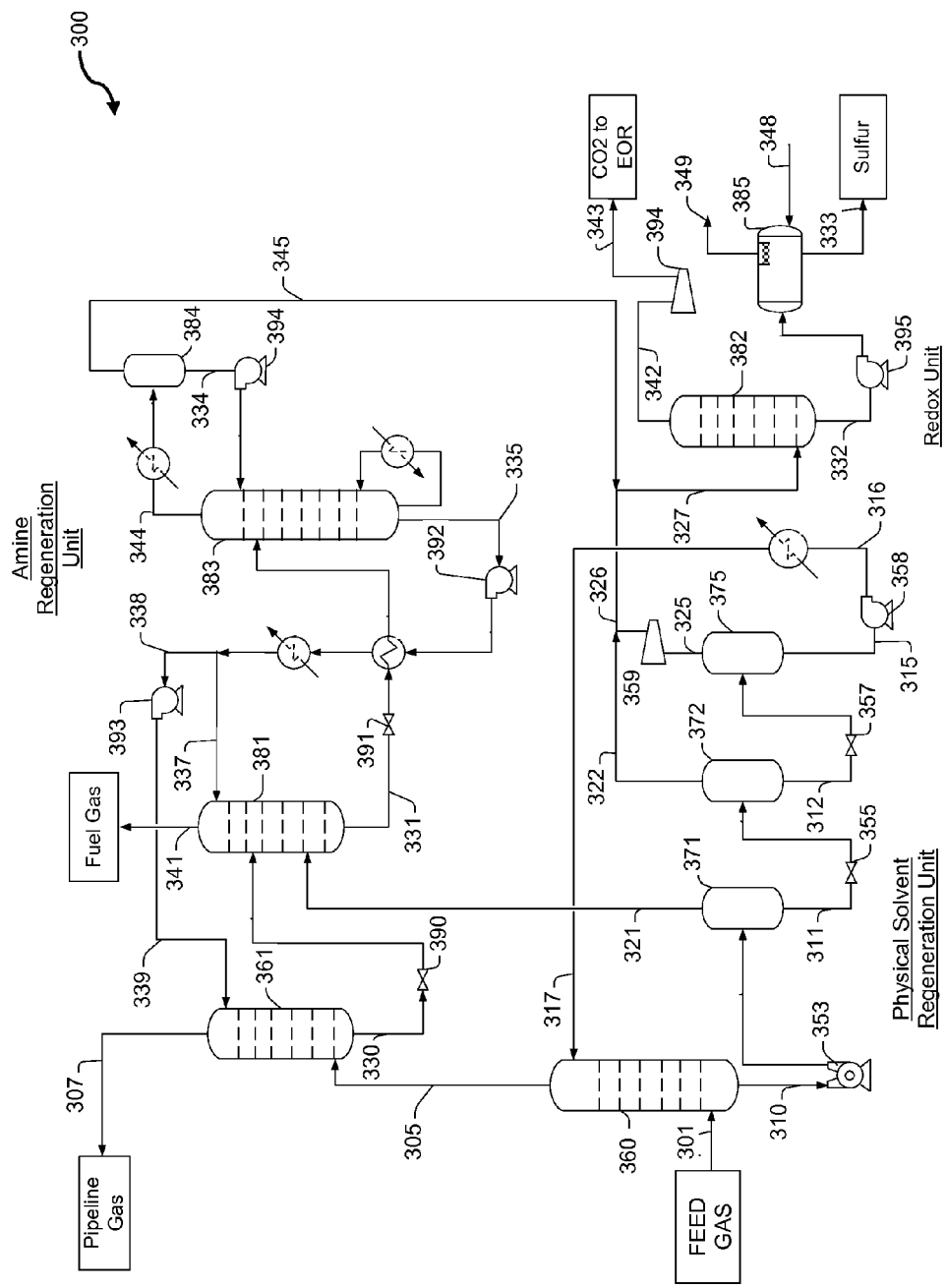
FIG. 3 is another exemplary schematic for an acid gas removal process using a physical solvent absorption unit, an amine absorber, and a redox unit in a plant to achieve zero emissions according to the inventive subject matter.

Another exemplary embodiment of the inventive plants, processes, and methods is illustrated in FIG. 3. The process shown is especially suited to processing feed gasses that have low H$_2$S concentrations and typically do not require H$_2$S enrichment and conventional Claus processing. When feed gas 301 yields less than 10 tons H$_2$S per day, it is more economical to employ a redox unit. Amine absorber 361 is dedicated to treated gas 305. Fuel gas scrubber 381 treats first flashed gas 321 from the first separator 371 of the physical solvent regeneration unit. Second flashed gas 322, third flashed gas 325, and H$_2$S rich stream 345 merge, forming combined H$_2$S rich stream 327. Sulfur is removed from H$_2$S rich stream 327 in absorber 382 of the redox unit. Absorber 382 contacts H$_2$S rich stream 327 with an iron-chelate solution to oxidize H$_2$S to sulfur.

In preferred embodiments, H$_2$S oxidation in absorber 382 is accomplished using a catalytic solution that comprises at least one polyvalent metal (preferably iron) chelated by at least one chelating agent, wherein the metal-chelate oxidizes the H$_2$S to elementary sulfur with concomitant reduction of the polyvalent metal from a higher oxidation state to a lower oxidation state. Thus, CO$_2$ rich stream 342 is produced with a reduced metal-chelate rich solution (or iron-chelate rich solution) 332 that contains elementary sulfur.

In especially preferred embodiments ferric and ferrous iron solutions, the ferric and ferrous ions are complexed by suitable chelating agents such as polycarboxylic amino-acids (e.g., nitrilotriacetic acid, ethylenediaminetetraacetic acid, diethylenetriaminepentaacetic acid). H$_2$S in H$_2$S rich stream 327 reacts with the iron-chelate according to the reaction equation:

$$H_2S + 2Fe^{3+} \rightarrow 2H^+ + S + 2Fe^{2+}$$

It should be appreciated that the elemental sulfur can be filtered from iron-chelate rich solution 332 in separator 385, forming a moist sulfur cake 333, which can be further upgraded to a 99.9% pure molten sulfur product.

The reduced iron-chelate solution is regenerated by oxidizing the chelated iron using air 349, according to the reaction equation:

$$2Fe^{2+} + 2H^+ + \frac{1}{2}O_2 \rightarrow 2Fe^{3+} + H_2O$$

The ferric iron (oxidized) solution can optionally be recycled back in redox treating absorber 382. "Sweet" gas 342 has a reduced concentration of H$_2$S and is enriched in CO$_2$. Compressor 394 compresses sweet gas 342 to generate CO$_2$ rich stream 343, which can be sequestered or employed in EOR.

Therefore, it should be apparent that the use of a redox unit is particularly advantageous for H$_2$S removal from shale gasses containing low H$_2$S levels.

Consequently, it is contemplated that configurations according to the inventive subject matter will significantly reduce overall energy consumption and capital costs for high acid gas removal as compared to conventional acid gas removal processes including membrane-based processes. Moreover, contemplated plants and processes typically do not require an external heat source, and heat sources if required will be supplied by the feed gas or heat of compression either from refrigeration and/or feed gas compression system further reducing energy consumption and impact on the environment. Still further, enhanced oil recovery projects will frequently encounter an increase in acid gas concentration in the feed gas, typically from 10% up to as high as 60%. Contemplated configurations and processes can accommodate these changes with essentially the same solvent circulation.

Another advantage of contemplated methods and configurations is their simplicity requiring less supporting offsite and utility systems, such as handling of spent solid waste of conventional sulfur scavenger beds, greatly reducing environment impacts.

Thus, specific embodiments and applications for configurations and methods for improved acid gas removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An acid gas processing plant, comprising:
    an absorption unit configured to (i) receive a feed gas comprising H2S and CO2 and (ii) use a lean physical solvent to absorb a portion of H2S and CO2 within the feed gas to produce a treated gas and a rich physical solvent;
    an amine absorber coupled to the absorption unit and configured to (i) receive the treated gas from the absorption unit and (ii) use a first portion of a lean amine to absorb a portion of H2S and CO2 within the treated gas to produce a pipeline gas and a semi-lean amine;
    a physical solvent regeneration unit coupled to the absorption unit and configured to (i) receive the rich physical solvent from the absorption unit and (ii) regenerate the lean physical solvent from the rich physical solvent for feeding into the absorption unit,
    wherein the physical solvent regeneration comprises a first separator that is configured to produce a first flashed gas as a byproduct of regenerating a first semi-lean physical solvent from the rich physical solvent; and
    an amine regeneration unit coupled to the amine absorber and configured to (i) receive the semi-lean amine from the amine absorber and (ii) regenerate the lean amine from the semi-lean amine for feeding into the amine absorber,
    wherein the amine regeneration unit comprises a fuel gas scrubber that is configured to (i) receive the first flashed gas and (ii) use a second portion of the lean amine to scrub the first flashed gas to produce a fuel gas and a rich amine.

2. The plant of claim 1, wherein the physical solvent regeneration unit further comprises a second separator that is configured to produce a second flashed gas as a byproduct of regenerating a second semi-lean physical solvent from the first semi-lean physical solvent.

3. The plant of claim 1, wherein the amine regeneration unit comprises a regenerator that is configured to (i) receive the rich amine from the fuel gas scrubber and (ii) produce an $H_2S$ rich stream as a byproduct of regenerating the lean amine from the rich amine.

4. The plant of claim 3, further comprising a redox unit that is configured to (i) receive a portion of the $H_2S$ rich stream from the regenerator and the second flashed gas from the second separator and (ii) apply an iron-chelate to the $H_2S$ rich stream and the second flashed gas to produce elemental sulfur and a $CO_2$ rich stream.

5. The plant of claim 2, wherein the amine regeneration unit comprises a second amine absorber that is configured to (i) receive the second flashed gas from the second separator and (ii) use a third portion of the lean amine to produce a $CO_2$ rich stream and a rich amine.

6. The plant of claim 5, wherein the amine regeneration unit comprises a regenerator that is configured to (i) receive the rich amine from second amine absorber and (ii) produce an $H_2S$ rich stream as a byproduct of regenerating the lean amine from the rich amine.

7. The plant of claim 6, further comprising a Claus unit configured to receive a portion of the $H_2S$ rich stream from the regenerator to produce elemental sulfur.

8. The plant of claim 1, wherein the lean physical solvent comprises at least one of FLUOR SOLVENT™ (propylene carbonate), NMP (normal-methyl pyrolidone), SELEXOL™ (dimethyl ether of polyethylene glycol), TBP (tributyl phosphate), and polyethylene glycol dialkyl ethers.

9. The plant of claim 1, wherein the lean amine comprises at least one of MDEA, DIPA, hindered amine, or other formulated tertiary amines.

10. An acid gas removal plant, comprising:
    a physical solvent absorption unit configured to receive a feed gas comprising H2S and CO2 and a lean physical solvent to produce a treated gas and a rich physical solvent;
    an amine absorption unit configured to receive the treated gas and a lean amine stream and to produce a pipeline gas;
    multi-stage flash regeneration separators configured to receive a rich physical solvent from the physical solvent absorption unit and to produce the lean physical solvent,
    wherein the multi-stage flash regeneration separators comprise a first separator that is configured to produce a first flashed gas as a byproduct of regenerating a first semi-lean physical solvent from the rich physical solvent; and
    an amine unit configured to receive a semi-rich amine stream from the amine absorption unit to remove the H2S and CO2 from a flashed gas from the multi-stage flash regeneration separators to produce a fuel gas and a rich amine stream,
    wherein the amine unit comprises a fuel gas scrubber that is configured to (i) receive the first flashed gas and (ii) use a second portion of the lean amine to scrub the first flashed gas to produce a fuel gas and a rich amine.

11. An acid gas processing plant, comprising:
    an absorption unit configured to (i) receive a feed gas comprising H2S and CO2 and (ii) use a lean physical solvent to absorb a portion of H2S and CO2 within the feed gas to produce a treated gas and a rich physical solvent;
    an amine absorber coupled to the absorption unit and configured to (i) receive the treated gas from the absorption unit and (ii) use a first portion of a lean amine to absorb a portion of H2S and CO2 within the treated gas to produce a pipeline gas and a semi-lean amine;
    a physical solvent regeneration unit coupled to the absorption unit and configured to (i) receive the rich physical solvent from the absorption unit and (ii) regenerate the lean physical solvent from the rich physical solvent for feeding into the absorption unit, wherein the physical solvent regeneration unit comprises (i) a first separator that is configured to produce a first flashed gas as a byproduct of regenerating a first semi-lean physical solvent from the rich physical solvent, and (ii) a second separator that is configured to produce a second flashed gas as a byproduct of regenerating a second semi-lean physical solvent from the first semi-lean physical solvent; and an amine regeneration unit coupled to the amine absorber and configured to (i) receive the semi-lean amine from the amine absorber and (ii) regenerate the lean amine from the semi-lean amine for feeding into the amine absorber, wherein the amine regeneration unit comprises a second amine absorber that is configured to (i) receive the second flashed gas from the second separator and (ii) use a third portion of the lean amine to produce a $CO_2$ rich stream and a rich amine.

12. The plant of claim 11, wherein the amine regeneration unit comprises a fuel gas scrubber that is configured to (i) receive the first flashed gas and (ii) use a second portion of the lean amine to scrub the first flashed gas to produce a fuel gas and a rich amine.

13. The plant of claim 12, wherein the amine regeneration unit comprises a regenerator that is configured to (i) receive the rich amine from the fuel gas scrubber and (ii) produce an $H_2S$ rich stream as a byproduct of regenerating the lean amine from the rich amine.

14. The plant of claim 13, further comprising a redox unit that is configured to (i) receive a portion of the $H_2S$ rich stream from the regenerator and the second flashed gas from the second separator and (ii) apply an iron-chelate to the $H_2S$ rich stream and the second flashed gas to produce elemental sulfur and a $CO_2$ rich stream.

15. The plant of claim 11, wherein the amine regeneration unit comprises a regenerator that is configured to (i) receive the rich amine from second amine absorber and (ii) produce an $H_2S$ rich stream as a byproduct of regenerating the lean amine from the rich amine.

16. The plant of claim 15, further comprising a Claus unit configured to receive a portion of the $H_2S$ rich stream from the regenerator to produce elemental sulfur.

17. The plant of claim 11, wherein the lean physical solvent comprises at least one of FLUOR SOLVENT™ (propylene carbonate), NMP (normal-methyl pyrolidone), SELEXOL™ (dimethyl ether of polyethylene glycol), TBP (tributyl phosphate), and polyethylene glycol dialkyl ethers.

18. The plant of claim 11, wherein the lean amine comprises at least one of MDEA, DIPA, hindered amine, or other formulated tertiary amines.

* * * * *